US008116598B2

(12) United States Patent  
Filley et al.

(10) Patent No.: US 8,116,598 B2  
(45) Date of Patent: Feb. 14, 2012

(54) LOCATION-REFERENCED PHOTOGRAPH REPOSITORY

(75) Inventors: George B. Filley, Barrington, IL (US); James Herbst, Chicago, IL (US); M. Salahuddin Khan, Lake Forest, IL (US); Robert Gourdine, Naperville, IL (US); Timothy Gibson, Barrington, IL (US); Jon Shutter, Chicago, IL (US); Frank Kozak, Naperville, IL (US)

(73) Assignee: NAVTEQ B.V., Veldhoven (NL)

( * ) Notice: Subject to any disclaimer, the term of this patent is extended or adjusted under 35 U.S.C. 154(b) by 0 days.

(21) Appl. No.: 12/694,614

(22) Filed: Jan. 27, 2010

(65) Prior Publication Data

US 2010/0128935 A1    May 27, 2010

Related U.S. Application Data

(63) Continuation of application No. 10/665,736, filed on Sep. 17, 2003, now abandoned.

(51) Int. Cl.
*G06K 9/54* (2006.01)

(52) U.S. Cl. ........................................ 382/305; 701/200

(58) Field of Classification Search .................. 701/200, 701/207–216; 382/305–306; 340/988–996
See application file for complete search history.

(56) References Cited

U.S. PATENT DOCUMENTS

| 4,949,268 A * | 8/1990 | Nishikawa et al. | 701/216 |
| 5,819,092 A | 10/1998 | Ferguson et al. | 395/701 |
| 5,890,171 A | 3/1999 | Blumer et al. | 715/229 |
| 5,893,101 A | 4/1999 | Balogh et al. | 707/100 |
| 5,913,078 A | 6/1999 | Kimura et al. | 396/50 |
| 6,023,241 A | 2/2000 | Clapper | 342/357.13 |

(Continued)

FOREIGN PATENT DOCUMENTS

EP    01139239    10/2001

(Continued)

OTHER PUBLICATIONS

Jong Hyock and Masataka Takagi, Extraction of Bridge Positions from IKONOS Images for Accuracy Control of Bridge Database, Proceedings of the 23rd Asian Conference on Remote Sensing, Kathmoandu, No. 172, 2002.*

(Continued)

*Primary Examiner* — Bhavesh Mehta  
*Assistant Examiner* — Sean Motsinger  
(74) *Attorney, Agent, or Firm* — Frank J. Kozak; Jon D. Shutter; Adil M. Musabji

(57) ABSTRACT

A photograph repository system includes data storage for storing photographs in the form of digital data files and a search feature that provides for searching for photographs by location and optionally by other search criteria. In one embodiment, a photograph repository service is accessible to users over a common data network, such as the Internet. In the photograph repository service, each stored photograph is associated with a location, i.e., where the photograph was taken and/or the location of an object in the photograph. Users can search for and obtain copies of their own photographs that they had stored previously with the photograph repository service. In addition, users can search for and obtain copies of photographs that had been taken by other users and stored with the photograph repository service. The photograph repository system can also be implemented as a standalone system, a hybrid system, or a peer-to-peer system.

8 Claims, 7 Drawing Sheets

U.S. PATENT DOCUMENTS

| | | | |
|---|---|---|---|
| 6,047,234 A * | 4/2000 | Cherveny et al. | 701/200 |
| 6,133,947 A | 10/2000 | Mikuni | 348/183 |
| 6,182,010 B1 | 1/2001 | Berstis | 701/211 |
| 6,282,362 B1 | 8/2001 | Murphy et al. | 386/46 |
| 6,323,885 B1 | 11/2001 | Wiese | 715/835 |
| 6,459,388 B1 | 10/2002 | Baron | 340/996 |
| 6,466,865 B1 | 10/2002 | Petzoid | 701/202 |
| 6,484,086 B2 | 11/2002 | Jeon | 701/93 |
| 6,504,571 B1 | 1/2003 | Narayanaswami et al. | 348/231.99 |
| 6,604,126 B2 | 8/2003 | Neiman et al. | 709/203 |
| 6,629,100 B2 | 9/2003 | Morris et al. | 707/10 |
| 6,691,032 B1 | 2/2004 | Irish et al. | 701/213 |
| 6,819,356 B1 | 11/2004 | Yumoto | 348/231.2 |
| 6,883,146 B2 | 4/2005 | Prabhu et al. | 715/854 |
| 6,895,126 B2 | 5/2005 | Di Bernardo et al. | 382/284 |
| 6,914,626 B2 | 7/2005 | Squibbs | 348/231.3 |
| 6,943,825 B2 | 9/2005 | Silvester | 348/113 |
| 6,950,198 B1 | 9/2005 | Berarducci et al. | 358/1.12 |
| 6,965,828 B2 | 11/2005 | Pollard | 701/213 |
| 6,977,679 B2 | 12/2005 | Tretter et al. | 348/231.2 |
| 7,100,190 B2 | 8/2006 | Johnson et al. | 725/105 |
| 7,135,994 B2 | 11/2006 | Kamikawa et al. | 340/995.14 |
| 7,171,113 B2 | 1/2007 | Parulski et al. | 396/287 |
| 7,197,158 B2 | 3/2007 | Camara et al. | 382/100 |
| 2001/0014222 A1 | 8/2001 | Honda et al. | 396/429 |
| 2001/0015759 A1 | 8/2001 | Squibbs | 348/232 |
| 2001/0016849 A1 | 8/2001 | Squibbs | 707/104.1 |
| 2001/0051850 A1 | 12/2001 | Wietzke et al. | 701/207 |
| 2001/0051876 A1 | 12/2001 | Seigel et al. | 705/1 |
| 2001/0056326 A1 | 12/2001 | Kimura | 701/208 |
| 2002/0007311 A1 | 1/2002 | Iseki et al. | 705/14 |
| 2002/0032787 A1 | 3/2002 | Overton et al. | 709/230 |
| 2002/0071677 A1 | 6/2002 | Sumanaweera | 396/429 |
| 2002/0093435 A1 | 7/2002 | Baron | 340/995 |
| 2002/0128773 A1 * | 9/2002 | Chowanic et al. | 701/210 |
| 2002/0143762 A1 | 10/2002 | Boyd et al. | 707/6 |
| 2002/0198736 A1 | 12/2002 | Harrison | 705/1 |
| 2003/0004693 A1 | 1/2003 | Neiman et al. | 703/1 |
| 2003/0009281 A1 | 1/2003 | Whitham | 701/211 |
| 2003/0021591 A1 | 1/2003 | Grosvenor et al. | 386/124 |
| 2003/0069693 A1 | 4/2003 | Snapp et al. | 701/123 |
| 2003/0069893 A1 | 4/2003 | Kanai et al. | 707/104.1 |
| 2003/0078724 A1 | 4/2003 | Kamikawa et al. | 701/208 |
| 2003/0164796 A1 | 9/2003 | Needham | 342/357.13 |
| 2003/0164822 A1 | 9/2003 | Okada | 345/204 |
| 2003/0184654 A1 | 10/2003 | Kinjo | 348/207.1 |
| 2003/0202104 A1 | 10/2003 | Werner | 348/207.99 |
| 2004/0049345 A1 | 3/2004 | McDonough et al. | 702/12 |
| 2004/0054463 A1 | 3/2004 | Bock | 701/207 |
| 2004/0075697 A1 * | 4/2004 | Maudlin | 345/848 |

FOREIGN PATENT DOCUMENTS

| | | |
|---|---|---|
| JP | 2002-202976 | 7/2002 |
| JP | 2002-229994 | 8/2002 |
| JP | 2002-373168 | 12/2002 |
| JP | 2003-233555 | 8/2003 |

OTHER PUBLICATIONS

Oregon Public Electronic Network: "Open Community News"; internet publication, Online!, vol. 6, No. 2 (2001) XP002343097; www.open.org/{library/opennews/open23.html#Around>.

EP 04255689.4 Search Report, dated Nov. 17, 2005.

EP 04255689.4 Search Report, dated Dec. 9, 2005.

* cited by examiner

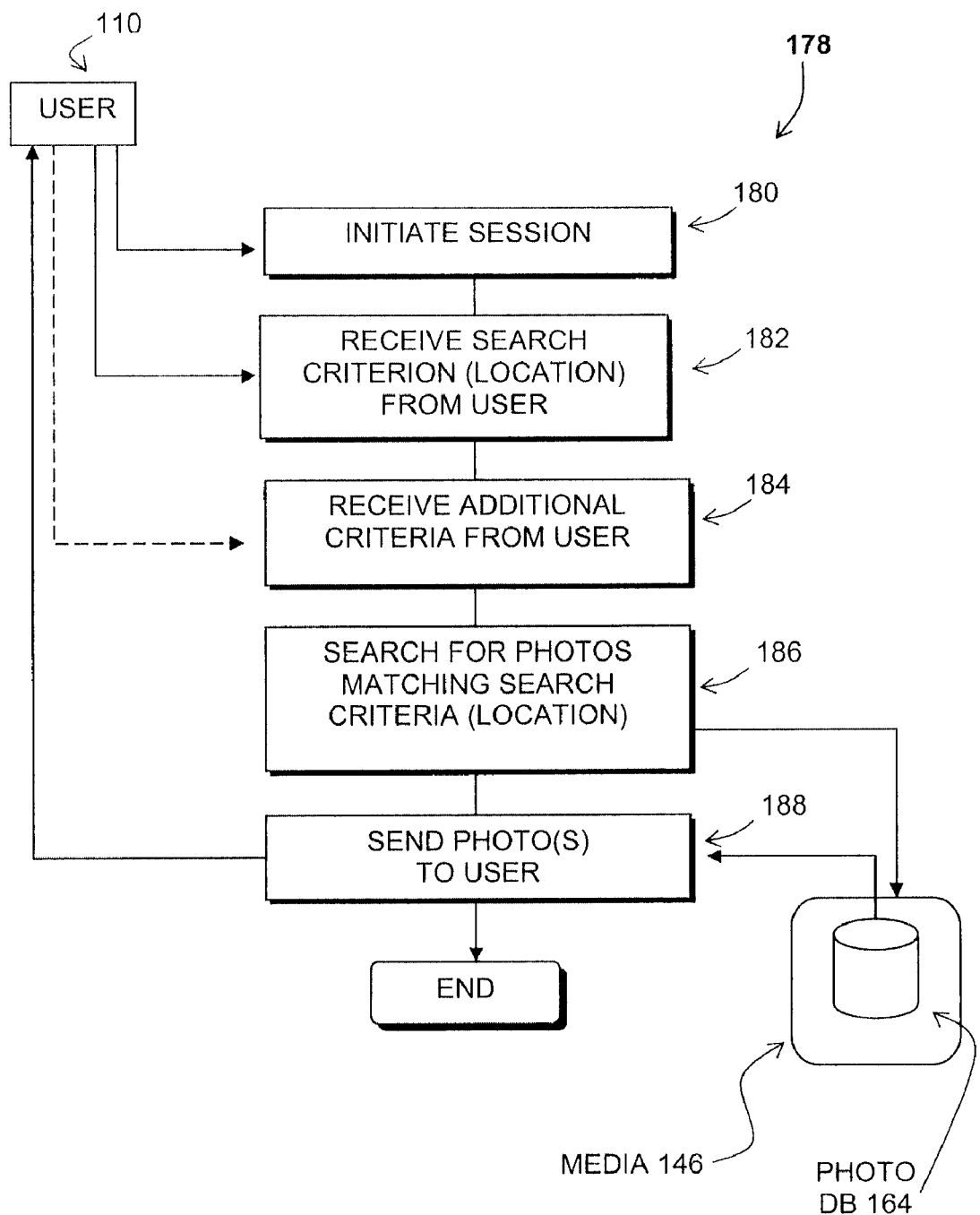

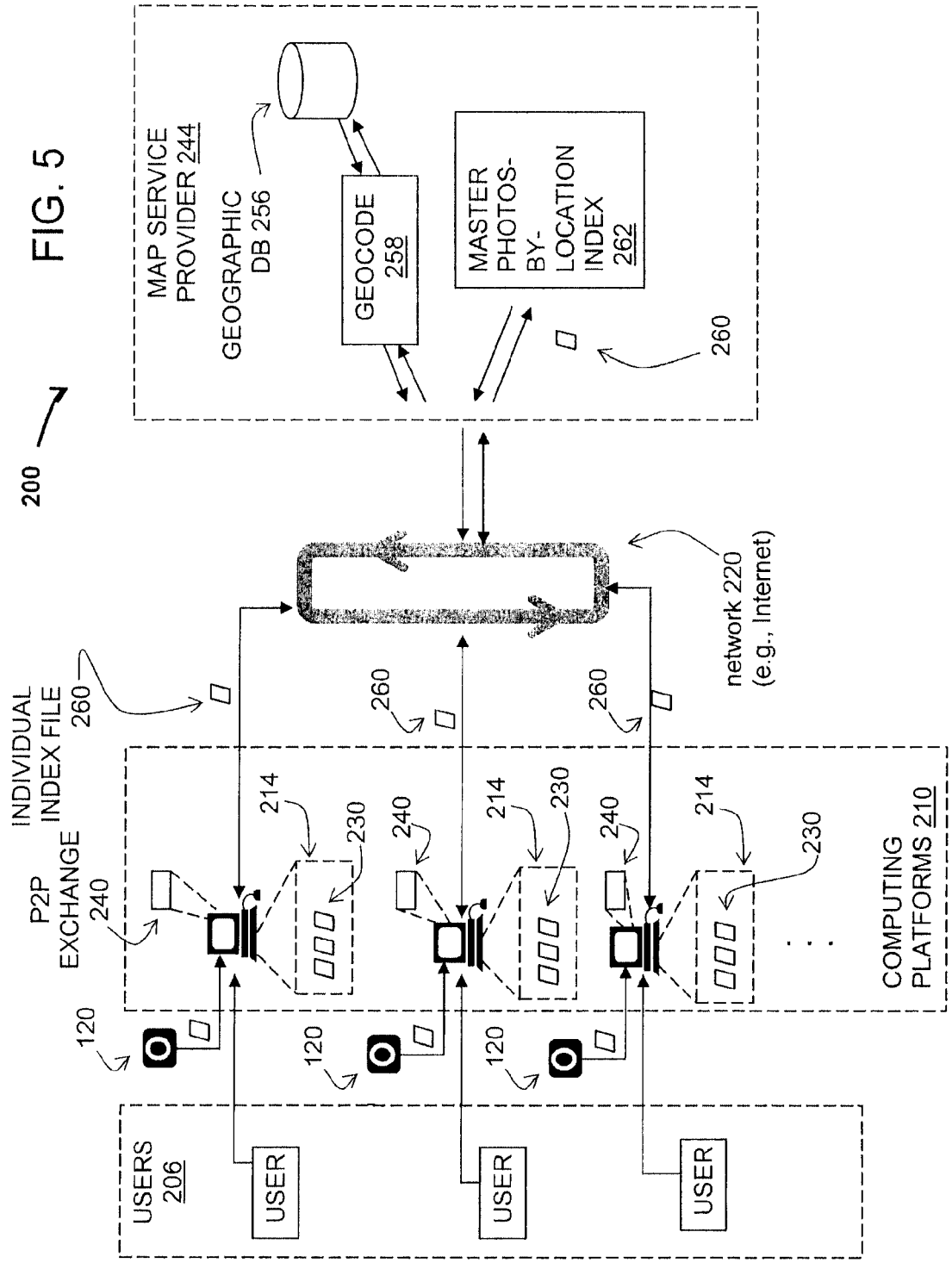

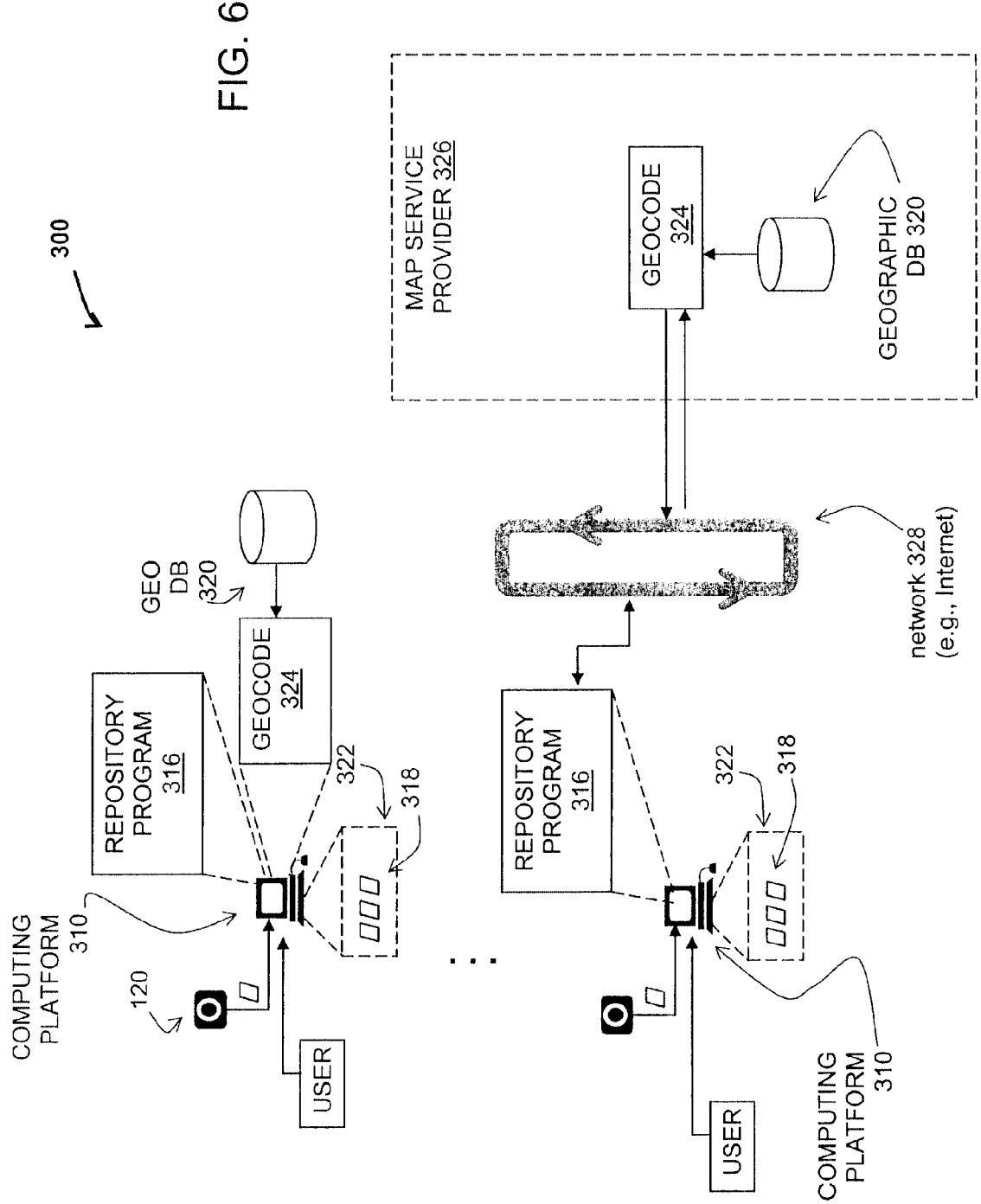

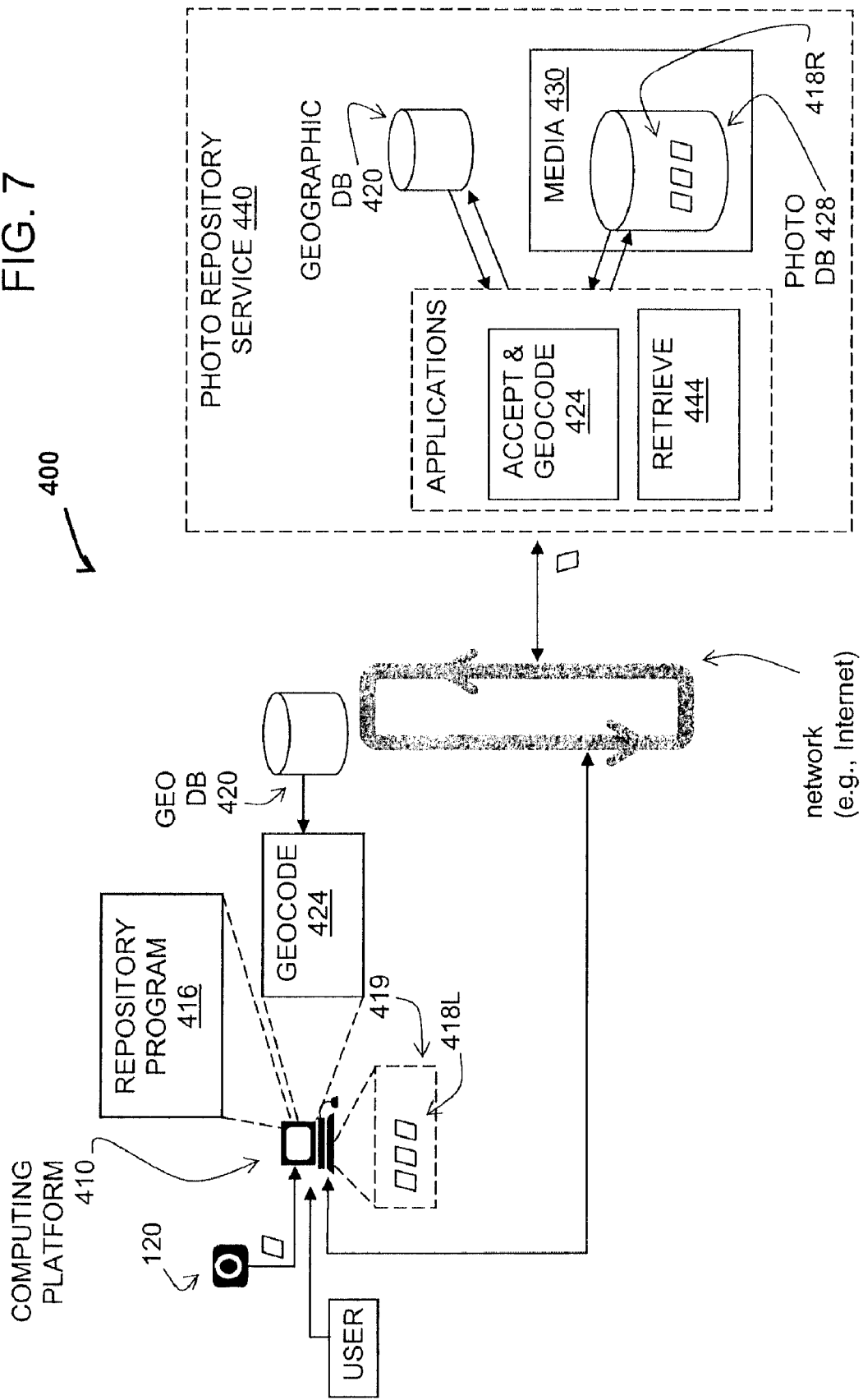

LOCATION-REFERENCED PHOTOGRAPH REPOSITORY

RELATED APPLICATIONS

The present patent application is a continuation of U.S. patent application Ser. No. 10/665,736, which was filed Sep. 17, 2003. The full disclosure of U.S. patent application Ser. No. 10/665,736 is incorporated herein by reference.

BACKGROUND OF THE INVENTION

The present invention relates to a system that enables persons to store and retrieve photographs and other images.

Digital photography has affected the ways that people take and use photographs. For example, because digital photographs exist as data files on computer-readable media, persons can easily exchange copies of digital photographs with friends and family members.

Digital cameras are expected to become more common as they become smaller and less expensive. As digital cameras become smaller and less expensive, they are being incorporated into other devices, such as PDAs ("personal digital assistants") and portable phones. As digital cameras become more available, people are expected to take more and more digital photographs.

Although digital photography has resulted in significant changes in the ways that people take and use photographs, there continues to be room for further improvements. One consideration associated with the large number of digital photographs being taken is how to organize them. Although taking photographs is easier and less expensive, it can be difficult to find a particular photograph because there are so many.

Accordingly, it is an objective to provide ways to organize photographs.

It is another objective to provide a way for users to exchange photographs.

SUMMARY OF THE INVENTION

To address these and other objectives, the present invention includes a photograph repository system. The photograph repository system includes data storage for storing photographs in the form of digital data files and a search feature that provides for searching for photographs by location and optionally by other search criteria. In one embodiment, the photograph repository system is a service accessible to users over a common data network, such as the Internet. In the photograph repository service, each stored photograph is associated with a location, i.e., where the photograph was taken and/or the location of an object in the photograph. Users can search for and obtain copies of their own photographs, i.e., that they had stored previously with the photograph repository service. In addition, users can search for and obtain copies of photographs that had been taken by other users and stored with the photograph repository service.

In alternative embodiments, the photograph repository system is implemented as a standalone system, a hybrid system, or a peer-to-peer system.

BRIEF DESCRIPTION OF THE DRAWINGS

FIG. 4 is a flowchart showing a process performed by the photo retrieval application of FIG. 1.

FIG. 5 is a diagram showing a peer-to-peer embodiment of a photograph repository system.

FIG. 6 is a diagram showing a standalone embodiment of a photograph repository system.

FIG. 7 is a diagram showing a hybrid embodiment of a photograph repository system.

DETAILED DESCRIPTION OF THE PRESENTLY PREFERRED EMBODIMENTS

I. First Embodiment

A. Overview of System

Figure 1:
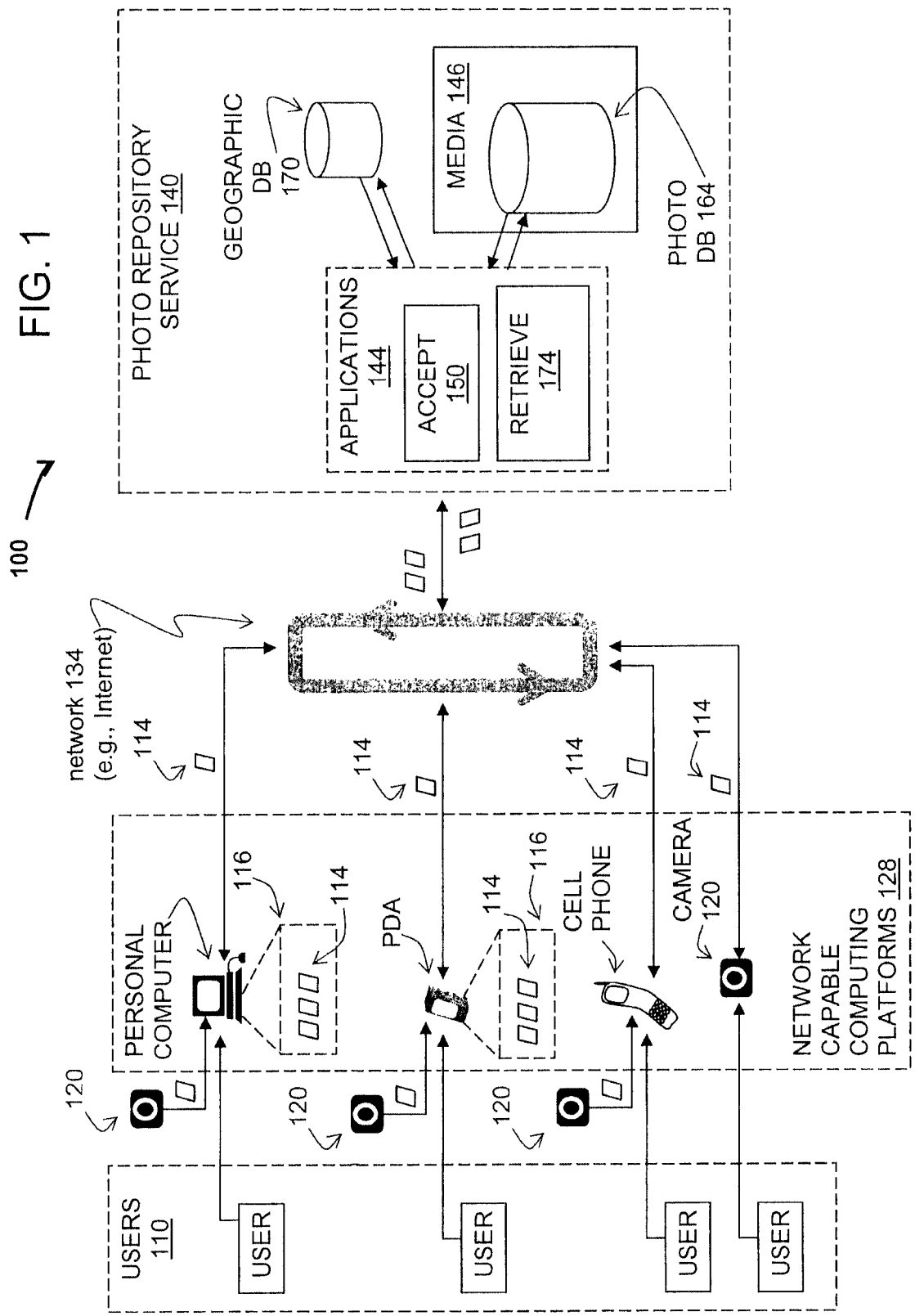
FIG. 1 is a diagram showing a first embodiment of a photograph repository system.

FIG. 1 shows a first embodiment of a photograph repository (or archive) system 100. In FIG. 1, users 110 have digital photographs. The digital photographs are in the form of data files 114 stored in suitable image formats, such as *.jpg, *.bmp, or *.png. Other suitable file formats may be used. The data files 114 that comprise the digital photographs are stored on suitable data storage media 116, such as flash memory cards, computer hard drives, CD-ROMs, DVDs, and so on. Any suitable data storage media may be used.

The digital photographs may be obtained from digital cameras 120 that are operated by the users 110. The digital cameras 120 may be standalone units or may be incorporated into other devices, such as portable phones or PDAs. Digital photographs may also be obtained from scanners that form image data files 114 from physical photographs (which may have been taken with either film cameras or digital cameras). The scanners may be connected to other suitable equipment, if necessary, such as personal computers.

In this embodiment, the users 110 may include individual people or corporate entities. The users 110 may include commercial or non-commercial users.

The users 110 operate devices 128 that are equipped to access a data network 134. The devices 128 include personal computers, PDAs, telephones, and so on. The devices 128 may use any means now known or developed in the future for interfacing with the network 134.

The network 134 may include any common data network, such as the Internet, or any other type of network capable of exchanging data, including public and private networks, POTS (plain old telephone service), wireless and land-based communications networks, and so on.

The users 110 operate the devices 128 to access a photograph repository service 140. The photograph repository service 140 is a combination of hardware and software components. The photograph repository service 140 allows users to store and retrieve digital photographs. For these purposes, the photograph repository service 140 includes suitable hardware and software that enables users to conduct interactive sessions in which the digital photograph data files are exchanged between the users and the photograph repository service 140. For example, the photograph repository service 140 includes one or more servers or other computing platforms and appropriate programming. The photograph repository service 140 also includes one or more data storage devices, such as hard drives, tape drives, etc.

B. Operation—Storage of Digital Photos

The photograph repository service 140 includes applications 144 that provide functions to users. The applications 144 provide for interactive on-line sessions between users and the photo repository service 140. In one embodiment, the applications 144 provide for accessing the photo repository service 140 using a web browser.

Among the applications 144 is an acceptance application 150. The acceptance application 150 enables users 110 to store their digital photographs (as data) on a data storage medium 146 in the photo repository service 140. (The data storage medium 146 may be one or more hard drives or other suitable equipment.) The acceptance application 150 also enables users to categorize their stored photographs by location. To provide for this feature, the acceptance application 150 enables users to associate each stored photograph with one or more location references. A location reference is a data item that is associated with a photograph. The location reference may indicate a location from which the photograph was taken (i.e., the "vantage point"). Alternatively, the location reference may indicate the location of a feature in the photograph (i.e., an object location). In another alternative, a photograph may be stored with a composite location reference that indicates both the location from which the photograph was taken and the location of one or more features or objects in the photograph.

Figure 2:
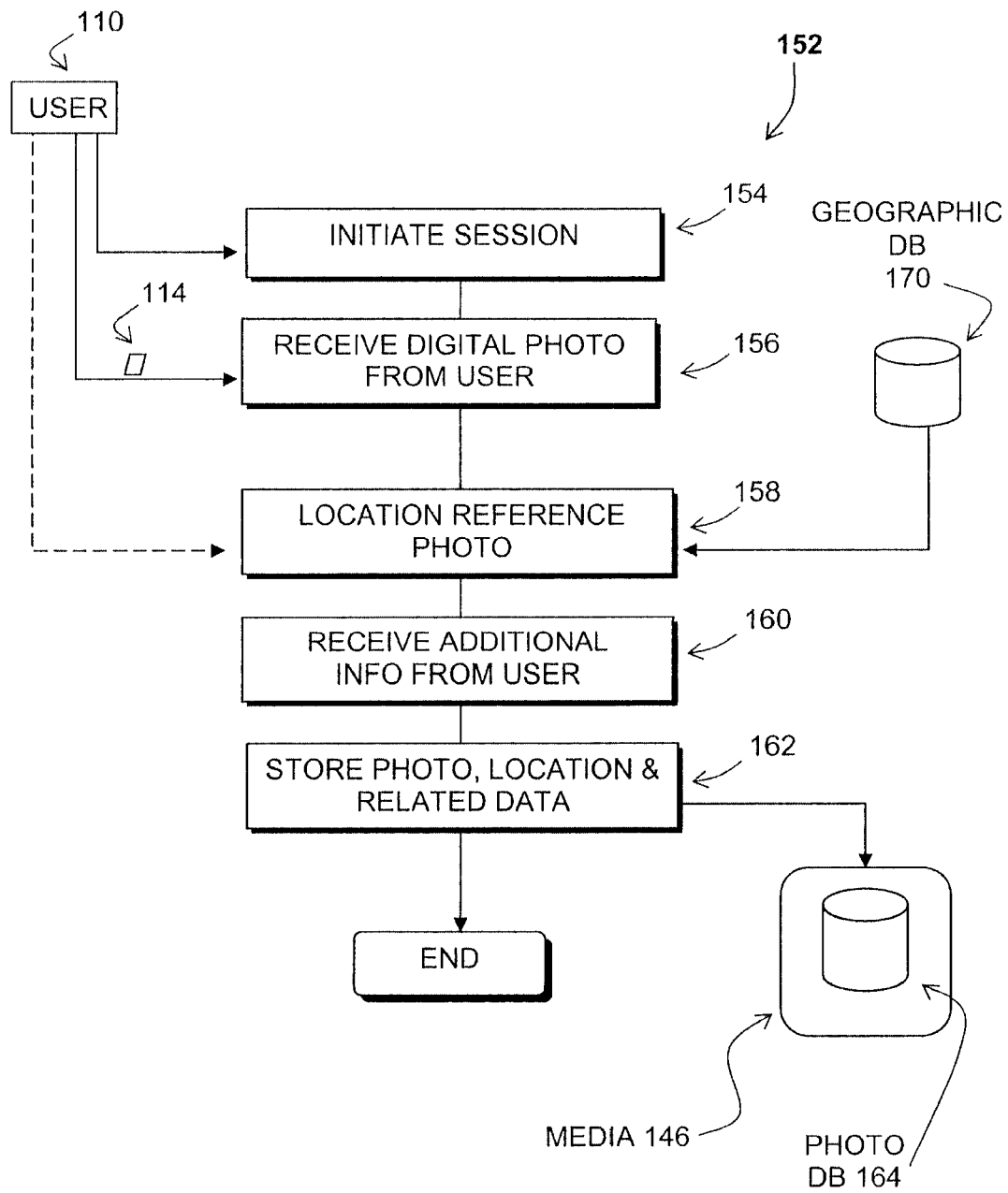
FIG. 2 is a flowchart showing a process performed by the photo acceptance application of FIG. 1.

FIG. 2 shows a process 152 performed by the acceptance application 150. In a first step, a session is initiated between a user and the photo repository service 140 (Step 154). Then, the photo repository service 140 receives a digital photograph (as a data file) from the user 110 (Step 156). Next, the photo repository service 140 associates one or more location references with the photograph (Step 158).

The location reference may be expressed in several different ways. For example, the location reference may be expressed as geographic coordinates (e.g., latitude, longitude, and optionally altitude). Alternatively, the location reference may be expressed as a street address (e.g., 1245 N. Main St., Springfield, Ill., USA). According to another alternative, the location reference may be expressed as a point relative to a map. Alternative ways of expressing a location reference may be supported.

The location reference to be associated with a digital photograph may be obtained in several different ways. Some cameras include positioning equipment, such as a GPS unit. These types of digital cameras are capable of determining a position (e.g., latitude and longitude coordinates) at which a photograph is taken. Data indicating the position are associated (e.g., linked, embedded) with the photograph image data file. Alternatively, the position information is overlaid on the photograph.

Another way that the photo repository service 140 may obtain a location reference to associate with a photograph is from the user. The acceptance application 150 provides a means for the user to indicate a location to associate with a photograph. According to one alternative, the acceptance application 150 may provide entry fields in a web page displayed on the user's computing platform into which the user can indicate a location. The acceptance application 150 may provide various different ways for the user to indicate a location. For example, the acceptance application 150 may allow the user to specify geographic coordinates. Alternatively, the acceptance application 150 may allow the user to specify a street address or street intersection. Alternatively, the acceptance application 150 may allow the user to specify a point of interest or a well-known location. The acceptance application 150 may also allow a user to specify an inexact or fuzzy address (e.g., a zip code or a neighborhood).

The acceptance application 150 also allows a user to provide additional information to be associated with a photograph (Step 160). This additional information may be optional. This additional information may include the identity (or alias) of the person submitting the photograph to the repository, an orientation (e.g., a compass heading and elevation) of the camera when the photograph was taken, a date on which the photograph was taken, a time-of-day at which the photograph was taken, the date the photograph is being archived, a title to be associated with the photograph, a subject matter category to be associated with the photograph, restrictions imposed on sharing the photograph with other users, and a user-provided description or narrative to be associated with the photograph. Other information may also be included. For example, aperture setting, focal length and shutter speed may be included.

Some of these types of information may be provided automatically, e.g., without requiring the user to input a value. For example, some cameras can automatically associate time-of-day data with a photograph. Similarly, cameras equipped with a compass or gyroscope can automatically associate orientation data with a digital photograph. Cameras can also automatically associate focal length, aperture setting and shutter speed data with photographs.

As stated above, restrictions may be imposed on the sharing of photographs with other users. In one embodiment, the photo repository may support password protection of photographs. According to this feature, a user storing a photograph on the photo repository may specify a password to be associated with the photograph. The photo repository would then make the photograph available to only users who specify the password.

Once the acceptance application 150 obtains the digital photograph, location reference information and any other information to be associated with the photograph from the user, the acceptance application 150 stores the digital photograph, location reference information and other associated information in a photo database 164 on the data storage medium 146 (Step 162). The acceptance application 150 stores the digital photograph, location reference information and other information so that the digital photograph is searchable. Accordingly, appropriate indexing or other data search techniques are used. In addition, appropriate indexing or other techniques may be used so that the digital photographs are searchable by any of the other stored information, such as by date, owner, and so on.

Figure 3:
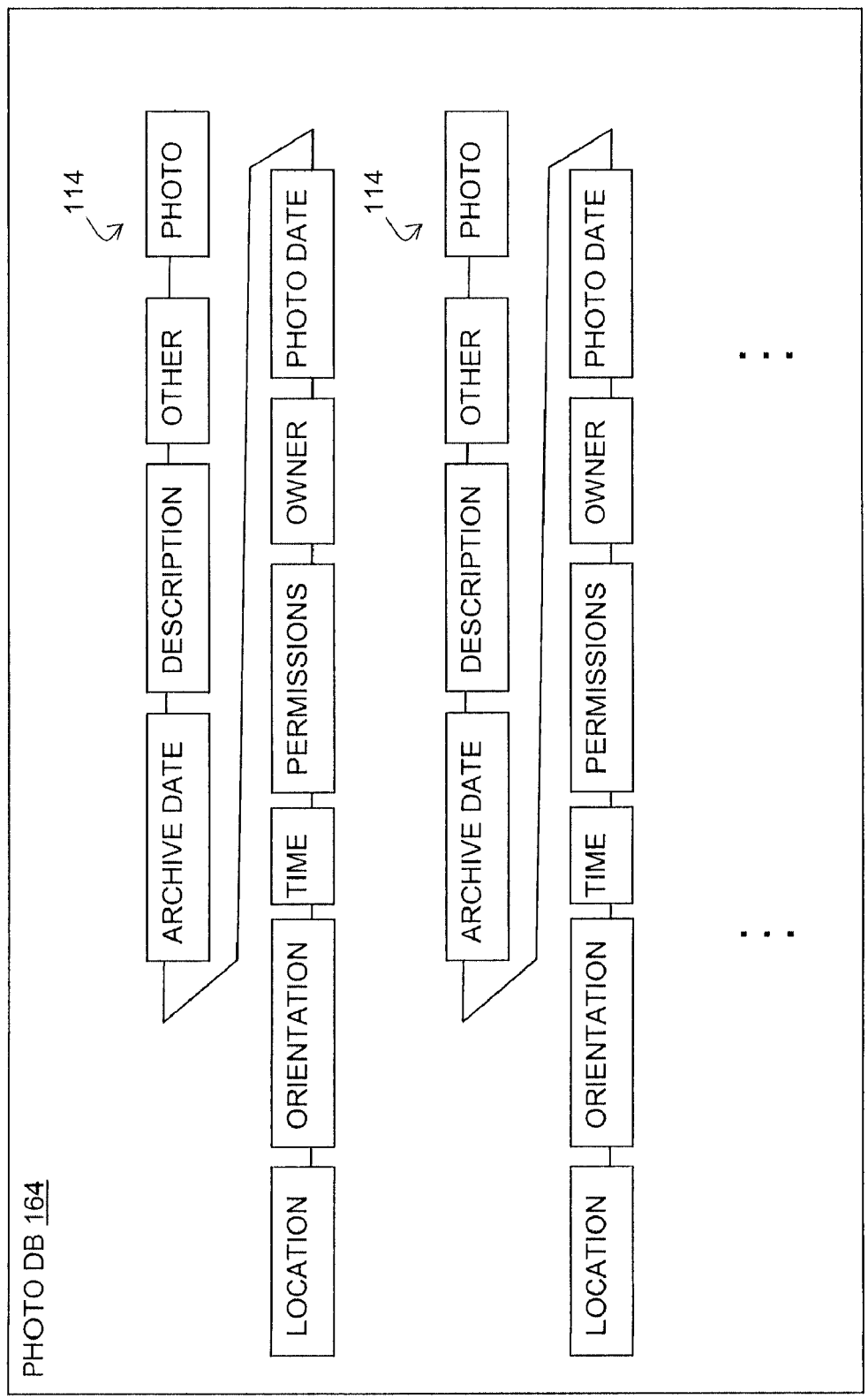
FIG. 3 is a block diagram showing components of the photo database of FIG. 1.

FIG. 3 shows an embodiment of some of the data components associated with stored photograph images 114 in the photo database 164.

Referring again to FIG. 1, the acceptance application 150 may transform the location reference information into one or more alternative formats as part of the process. This transformation process is performed so that photographs may be searched by location using any of several alternative location referencing systems. As part of this process, the acceptance application 150 may geo-code the location information. As an example, if a user specifies a photograph location by street address, the acceptance application 150 may determine the geographic coordinates of the street address provided by the user and associate (e.g., store) the geographic coordinates as well as the street address specified by the user in the photo database 164. In order to perform this function, the acceptance application 150 may use a geographic database 170 that associates addresses and geographic coordinates. Such databases are available from commercial sources, such as Navigation Technologies Corporation of Chicago, Ill. Similarly, if the user specifies geographic coordinates, the acceptance application 150 may determine a street address that corresponds to the coordinates and store the street address as well as the geographic coordinates in the photo database 164. Conversion to other location referencing formats may also be performed.

C. Operation—Retrieval of Photos

Referring still to FIG. 1, the photo repository service 140 also includes a retrieval application 174. The retrieval application 174 enables each user to retrieve his/her own photographs from the photo database 164. When retrieving photos, a user may use the location associated with the photo as a search criterion. Alternatively, a user may use any of the other attributes associated with a photo as a search criterion. The photo retrieval application 174 also provides a means by which users can obtain (e.g., retrieve) copies of photos taken by others from the photo database 164 using the location of the photo as a search criterion or alternatively, any of the other attributes associated with a photo as a search criterion.

The retrieval application 174 is accessed and used in the same or a similar way as the acceptance application 150. The user 110 operates the device 128 that is equipped to access the data network 134. The photo retrieval application 174 provides for an interactive on-line session between the user 110 and the photo repository 140.

FIG. 4 shows a process 178 performed by the photo retrieval application 174. In a first step, an interactive on-line session is initiated between a user and the photo repository service 140 (Step 180). Upon initiating the session with the photo repository 140, the user is prompted to search for photos by location (Step 182). The user may be presented with labeled entry fields on a display of the device 128 used to access the photo repository 140. Alternatively, the user may be prompted to indicate the location using voice input. The user may specify the location in various ways. For example, the user may specify the location by geographic coordinates. Alternatively, the user may specify the location by street address. According to other alternatives, the user may specify the location by cross streets or by the name of the location. The user may also specify an approximate location (e.g., a zip code).

In a present embodiment, the user may also provide one or more additional criteria to restrict the search for photos (Step 184). For example, the user may want only photos of 1245 Main Street, Springfield, Ill. that were taken between Jul. 1, 2002 and Aug. 1, 2002. According to another alternative, the search may be restricted spatially. For example, the search may be restricted to a specified distance from a reference point (e.g., a search radius) or to a specified bounding area (e.g., a bounding rectangle). Appropriate input fields may be presented to the user for these purposes.

Upon obtaining information from the user that specify the criteria for selecting photos, the photo retrieval application 174 conducts a search of the photo database 164 for photos that match the specified criteria (Step 186). The matching photos, if any, are provided to the user (Step 188). Full copies of the matching photos may be provided to the user. Alternatively, only thumbnail copies of the matching photos may be provided initially with full copies available upon further selection by the user. According to another alternative, a count of the number of matches is provided to the user and the user is requested to indicate whether to transmit all, or just some of the photos. According to still another alternative, if there are a large number of matches, the user may be provided with a portion of the results (e.g., ten matches), with a link to get another portion (e.g., the next 10) and so on.

III. Alternatives

A. Peer-to-Peer

FIG. 5 shows an alternative embodiment 200 of the photo repository system. In the embodiment of FIG. 5, a peer-to-peer technology is used to store and exchange photographs.

In FIG. 5, each user 206 has a computing platform 210 that has a data storage device 214. The computer platform 210 may be a personal computer or PDA. The data storage device 214 may be a hard drive, CDROM or DVD. Other types of computing platforms and data storage devices may be suitable. The end users' computer platforms 210 are connected to a data network 220, such as the Internet.

Each end user has digital photographs stored on his/her data storage device 214 of his/her respective computer platform 210. The digital photographs are obtained from digital cameras 120 or from other sources, such as scanners. The digital photographs are stored as data files 230 in appropriate image formats, such as jpeg, gif, png, etc.

In the embodiment of FIG. 5, instead of transmitting copies of their digital photographs to a central photograph repository (as in the embodiment of FIG. 1), each end user retains his/her copies of digital photographs on his/her own local data storage device 214 but makes the digital photographs available to other users over the data network 220. In order for users to find digital photographs of other users, each end user runs a peer-to-peer photo exchange program 240.

The peer-to-peer photo exchange program 240 allows end users to conduct searches for digital photographs of other end users and to download selected digital photographs from the other end users' local data storage devices. In the embodiment of FIG. 5, the peer-to-peer photo exchange program 240 provides for searching by location (i.e., the location where the photograph was taken or the location of an object in the photograph).

The peer-to-peer photo exchange program 240 is obtained from a map service provider 244 or other source. The peer-to-peer photo exchange program 240 installs a client component on an end user's computer. The peer-to-peer photo exchange program 240 provides an indexing function that allows the photo files stored on an end user's computing platform to be categorized by location, e.g., with location references. The peer-to-peer photo exchange program 240 uses a geographic database 256 to geocode an end user's photographs. The geographic database 256 and geocoding software 258 may be located on a server associated with the photo service provider 244. As described in connection with the first embodiment, the peer-to-peer photo exchange program 240 may provide for various different ways of indicating location, such as by street address, geographic coordinates, and so on. Also as described in connection with the first embodiment, the peer-to-peer photo exchange program 240 may provide for different ways by which location data may be associated with a photograph. In addition, the peer-to-peer photo exchange program 240 may also provide for associating additional attributes (e.g., date, orientation, etc.) with photograph images and providing for searches based on these additional attributes.

After an end user has associated a location with each digital photograph to be shared, the client component of the peer-to-peer photo exchange program 240 forms an individual index file 260. The individual index file 260 indicates the location references (and possibly other searchable attributes) associated with a user's photographs and includes references (e.g., pathnames) to the associated photograph data files. The individual index file 260 is transmitted over the data exchange network 220 to the map service provider 244. In this embodiment, the photograph data files are not transmitted to the map service provider 244 but instead remain on the user's local data storage device.

The map service provider 244 receives an individual index file 260 from each user. The map service provider 244 integrates the individual index file 260 obtained from each user into a master index file 262. The master index file 262 indexes the photographic data files from all end users by their associated locations. When an individual index file 260 from a user is integrated into the master index file 262, references to the photograph data files on the end user's computing platform are augmented with a reference to the end user's computer on the network, e.g., an IP address.

Using the master index file 262, the peer-to-peer photo exchange program 240 enables users to search for photographs stored on any data storage device (e.g., hard drive) connected to the network 220. The peer-to-peer photo exchange program 240 enables searches for photographs by their associated location references (i.e., where the photographs were taken or the locations of features in the photographs). By providing a centralized master index, searches for photographs can be conducted quickly and efficiently. Keeping the photographs on the end users' local data storage devices reduces the need for providing a large amount of data storage on a server.

B. Standalone Version

Another alternative embodiment of a photo repository system 300 is shown in FIG. 6. The embodiment of FIG. 6 includes decentralized storage of photographs. According to this embodiment, each user has a computing platform 310 that runs a repository program 316 that provides for associating location data (and possibly other information) with digital photographs 318 and then search for digital photographs based on the associated location. In order to geocode the photographs, the repository program 316 uses a geographic database 320 and a geocoding program 324. In one version of this embodiment, the geographic database 320 and geocoding program 324 are stored locally (i.e., on the end user's computing platform). In an alternative version of this embodiment, the geographic database 320 and geocoding program 324 are stored remotely (e.g., with a map service provider 326) and accessed over a network 328 by the local portion of the repository program 316. In still another version of this embodiment, the geocoding program 324 is stored locally and the geographic database 320 is stored remotely and accessed by the local geocoding program 324. The repository program 316 provides that the digital photographs can be stored locally, i.e., on a data storage device, such as a hard drive 322, located with the end user's own computing platform 310.

This embodiment is similar to the other embodiments in that the users are provided with a way to organize their digital photographs. The digital photographs 318 stored on a user's local hard 322 are associated with location references. As in the previously described embodiments, users may employ various search criteria to find photographs of interest. As in the previously described embodiments, users may search for photographs by location, i.e., the location associated the photograph. In this embodiment, the repository program 316 provides that the photographs stored locally are kept private and not necessarily shared with others.

C. Hybrid Version

Another alternative embodiment 400 of the photo repository system is shown in FIG. 7. The embodiment of FIG. 7 is a hybrid version that provides for both centralized and decentralized storage of photographs. In this embodiment, each user has a computing platform 410 that runs a repository program 416 (similar to the program 316 in FIG. 6) that provides for associating location data with digital photographs and then search for digital photographs based on the associated location data. Photographs are geocoded (i.e., associated with location references) using a local or remote geographic database 420 and local or remote geocoding software 424. The repository program 416 provides that the user can store some digital photographs 418L locally on a data storage device 419 located with the end user's own computing platform 410 so that these photographs can be kept private and not necessarily shared with others. The repository program 416 also provides that the user can store some photographs 418R remotely in a photo database 428 on a data storage device 430 associated with a remotely located photo repository 440. The remotely stored photographs 418R are shared with other users, as described in connection with the first embodiment (in FIG. 1).

In this embodiment, the location referencing of locally stored photographs is compatible with the location referencing of remotely stored photographs. Searches may be performed for locally stored photographs, remotely stored photographs, or both locally and remotely stored photographs. Compatible location referencing facilitates the ability to interact with the remote photo repository 440 for sharing, purchasing, and selling photographs and other information (such as point of interest information).

D. Groups

According to this alternative, a photo repository system provides for the establishment of groups. A group refers to one or more users. A group can be established to include various users who have a common interest in sharing photographs. For example, a group may include all members of a family, all employees of a company, all employees of a company above (or below) a certain management level, all employees of a department in a company, all members of a labor union, all students or faculty of an educational institution, all residents of a neighborhood, all customers of a business, all members of a religious institution, clubs, societies, and so forth. In this embodiment, the photo repository allows stored photographs to be group-restricted. The photo repository allows photographs to be shared only within the group.

In one alternative, all members of the group can store photos in, retrieve photo from or remove photos from the photo repository. In other alternatives, only some group members are authorized to store or delete photos.

The photo repository may use various means to verify and authenticate group members.

Groups may be implemented with various different embodiments of the photo repository system. For example, groups may be implemented with a centralized photo repository (e.g., FIG. 1), a peer-to-peer photo repository (e.g., FIG. 5), or a hybrid photo repository (e.g., FIG. 7).

E. Other alternatives

In one alternative embodiment, the photograph repository can provide a marketplace to buy and sell photographs. Photographs for sale may be photographs taken by professional photographers or that otherwise have value. According to this embodiment, a user accesses the photo repository and selects a location reference. The location reference may be a location from which the user took a photograph or may be a location in which the user has an interest. The photo repository identifies photos that match the user's search criteria and also indicates prices for the identified photos. The prices may be fixed or negotiable. If the user wishes the purchase an identified photograph, the user pays for it using any available method for making on-line purchases. The buying and selling of photographs on the photo repository may be provided in addition to the free exchange of photographs.

According to another alternative embodiment, the photo repository service may also provide navigation-related or map-related features. These navigation-related or map-related features may pertain to the locations of photographs. As an example, when a user obtains a photograph from the photo repository service, the user may be provided with routing directions (e.g., turn-by-turn driving instructions, pedestrian, inter-modal) to the location associated with the photograph. According to another alternative, when a user obtains a photograph from the photo repository service, the user may be provided with a map that shows the location associated with the photograph.

In further alternative embodiments, a photo-taking location assistance feature is provided. According to this feature, an application (executed on a standalone, server, or hybrid system) allows a user to specify subject matter categories (e.g. historical sites, natural/scenic, etc.) that he/she wants to take pictures of. As the user travels through a geographic area, the user's position is determined on a regular basis by equipment (e.g., GPS, cell phone positioning) in the standalone, server, or hybrid system. The photo-taking location assistance feature of the application notifies the user when the user is in proximity to a location where a photo can be taken of an object of one of the user's specified subject matter categories. Alternatively, the application may direct the user (e.g., with driving or pedestrian routing instructions) to the location where a photo can be taken of an object of one of the user's specified subject matter categories. Once the user takes a picture, all the other repository-related functions mentioned in connection with the various embodiments apply.

In another alternative embodiment, the photo repository may include links to web cam feeds. These web cam feed links would be categorized and searchable by location. According to this embodiment, the photo repository service includes an acceptance application for web cam links. This acceptance application for web cam links would be similar to the photo acceptance application described above. A user who is operating a web cam would provide a link to the web cam's network address. The user would also indicate the physical location (e.g., geographic coordinates, street address, etc.) of the web cam, and possibly other information, such as the orientation of the web cam, permissions, etc. The link and location information would be stored in a database file at the photo repository. (The web cam links may be stored in the same database used to store digital photographs, or alternatively the web cam links may be stored in a separate database.) Using this information, the photo repository service would be a resource for viewing live conditions anywhere in the world. As an example, a user may want to get a live view of weather conditions at a particular location. The user would search the photo repository database for a web cam feed associated with that particular location. If a web cam feed is available for the desired location, the link to that web cam is sent the user. Then, the user uses the link to receive the web cam feed to observe conditions at the location.

Another use for the photo repository is to provide evidence in judicial matters or to aid investigations. As an example, the photo repository could be used to find photographs of a particular location taken on a particular day in order to corroborate a witness's testimony. The photo repository might also be used to establish before-and-after conditions at sites of accidents, fires, etc.

Another way that the photo repository can be used is to view sites that were visited in the past to observe how they have changed. For example, a user may store a series of photos showing locations visited on a vacation. Years later, the user may obtain current photographs of those same locations in order to see how they have changed.

According to another embodiment, the photos stored in the photo repository by users can be used by a map developer to create new maps or update existing maps. Because photos stored in the repository are indexed by location, a map developer can use the photos taken by users to obtain information about the locations in the photos. As an example, if a photo taken by a user shows a bridge, the map developer can examine the photo to obtain information about the bridge, such as the number of lanes of traffic, the bridge height, the bridge length, road signs, and so on. Similarly, a user's photo of a building can be used by the map developer to obtain information about the building height, footprint, address, and so on. The information obtained in this manner may be used directly by a map developer for creating or updating a map, for example, by comparing features in the photos with the map, or alternatively, the information obtained in this manner may be used by the map developer to determine where to send field personnel for updating purposes.

The various embodiments of the photo repository may include versions particularly designed for either home or business uses.

In some of the embodiments disclosed above, photo repository software or data are stored locally on an end user's computer platform. In these embodiments, the software or data may be downloaded to the end user's computer platform. Alternatively, the software or data may be provided on media (e.g., CD-ROM) delivered to the end user.

In another embodiment, the photo repository can provide users a feature that allows a plurality of stored photographs to be associated with each other. As an example, a user may take a number (e.g., 50) of photographs while on a vacation. According to this embodiment, the photo repository allows the user to associate these photographs as a set. The user may be allowed to name the set (e.g., Hawaiian vacation, August 2003). When the user wishes to retrieve these photos for viewing, the photo repository would allow the user to retrieve the photos as a set.

It was stated above in connection with the embodiment of the photo repository that used peer-to-peer data exchange technology that photos stored on end users' computers were referenced by a link that included the end user's network address. One way to implement this is to establish a separate domain or suffix to be used for photo links, e.g., .pix.

There are various ways to generate revenue from the operation of embodiments of the photo repository. In one alternative, end users pay a fee for storage of photographs in the repository. Alternatively, end users pay a fee for downloading photographs of others. In another alternative, advertising is presented to the users when they access or use the photo repository. Alternatively, advertising may be added to or overlaid on downloaded photographs. In alternatives in which users install repository software or geographic data locally, the users may pay a fee (e.g., a license fee) for the software and/or data.

As mentioned above, a user may search the photo repository for stored photographs based on search criteria other than location. In one embodiment, users may search the photo repository for photographs by color or color combination. In this embodiment, a user may want a photograph having a specific color or combination of colors for decorating purposes, for example. According to this embodiment, the photo repository supports searches of stored photographs based on the dominant color or color combinations in the photographs.

Searches may combine color with other criteria (e.g., photographs of the Grand Canyon that have strong red colors).

According to another embodiment, the photo repository includes a free text search engine. This would enable searches for photos based on any word or phrase associated in any way with a photograph. Inexact and fuzzy matches would also be supported.

Another feature included in an alternative embodiment of the photo repository provides for automatic recognition of placenames when entering text. As mentioned above, some embodiments of the photo repository allow a user to provide a description, title or narrative to be associated with a photograph when the photograph is being stored. The user may provide these types of information as text. According to this feature, if a user indicates a placename when providing text for a description, title or narrative, the photo repository automatically identifies the potential placename and asks the user to confirm that the identified text is the placename of the location associated with the photograph. As an example, if a user provides the text "This is a picture of the Empire State Building at noon" for a description to be associated with a digital photograph being stored, the photo repository automatically identifies the text "Empire State Building" as the name of a place and asks the user to confirm that the object in the picture is the "Empire State Building." If the user confirms that the object in the picture is the Empire State Building, the photo repository automatically associates the location of the Empire State Building with the photo being stored. The photo repository can automatically identify placenames in text by comparing user-entered text to a table of placenames, searching user-entered text for placename patterns (e.g., "1245 Main Street", first letter capitalized words), or various other means.

It is intended that the foregoing detailed description be regarded as illustrative rather than limiting and that it is understood that the following claims including all equivalents are intended to define the scope of the invention.

We claim:

1. A method for generating map updates, comprising:
   accessing a data repository containing digital photographs obtained from a plurality of users over a network, wherein each of the digital photographs is associated with location data representing physical location where the digital photograph was taken;
   searching the data repository for at least one digital photograph using the associated location data;
   receiving the at least one digital photograph;
   obtaining a digital map of a geographic area that includes the physical location associated with the at least one digital photograph;
   comparing physical features depicted in the at least one digital photograph with the digital map to identify whether the physical features are represented in the digital map; and
   upon identifying at least one physical feature in the at least one digital photograph that is not represented in the digital map, updating the digital map to include data that represents the at least one physical feature.

2. The method of claim 1, wherein the at least one physical feature includes a bridge.

3. The method of claim 2, wherein the at least one physical feature includes height of the bridge.

4. The method of claim 2, wherein the at least one physical feature includes length of the bridge.

5. The method of claim 1, wherein the at least one physical feature includes a road sign.

6. The method of claim 1, wherein the at least one physical feature includes a building.

7. The method of claim 6, wherein the at least one physical feature includes height of the building.

8. The method of claim 6, wherein the at least one physical feature includes a footprint of the building.

* * * * *